US008493886B2

(12) United States Patent
Moritomo

(10) Patent No.: US 8,493,886 B2
(45) Date of Patent: Jul. 23, 2013

(54) ALLOCATION OF A SECONDARY BAND TO EXPAND THE CAPACITY OF A PRIMARY BAND IN A WLAN 802.11 SYSTEM

(75) Inventor: Kazuo Moritomo, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 169 days.

(21) Appl. No.: 12/529,702

(22) PCT Filed: May 16, 2008

(86) PCT No.: PCT/JP2008/059486
§ 371 (c)(1),
(2), (4) Date: Sep. 2, 2009

(87) PCT Pub. No.: WO2008/143329
PCT Pub. Date: Nov. 27, 2008

(65) Prior Publication Data
US 2010/0061325 A1    Mar. 11, 2010

(30) Foreign Application Priority Data

May 16, 2007  (JP) ................................. 2007-130436

(51) Int. Cl.
*H04L 12/28* (2006.01)
*H04W 4/00* (2009.01)

(52) U.S. Cl.
USPC ............ 370/254; 370/329; 370/331; 370/338

(58) Field of Classification Search
USPC .................. 370/322, 329, 331, 336, 338, 348
See application file for complete search history.

(56) References Cited

U.S. PATENT DOCUMENTS

| 7,430,195 B2 | 9/2008 | Utsunomiya et al. |
| 2005/0208956 A1* | 9/2005 | Takagi et al. ................. 455/464 |
| 2005/0220050 A1* | 10/2005 | Uchida ......................... 370/329 |

(Continued)

FOREIGN PATENT DOCUMENTS

| CN | 1713775 A | 12/2005 |
| EP | 1096730 A1 | 5/2001 |

(Continued)

OTHER PUBLICATIONS

IEEE P802.11/D2.00, Draft Standard for Information Technology—Telecommunications and information exchange between systems—Local and metropolitan area networks—Specific requirements—Part 11: Wireless LAN Medium Access Control (MAC) and Physical Layer (PHY) specifications, Feb. 2007.*

(Continued)

*Primary Examiner* — Brandon Renner
(74) *Attorney, Agent, or Firm* — Fitzpatrick, Cella, Harper & Scinto

(57) ABSTRACT

If frequency band (channel) expansion is made without careful consideration, communications of other apparatuses are disturbed. An apparatus which belongs to an identical network before expansion of the frequency band may no longer be able to make a communication after expansion of the frequency band. To accomplish this, upon making communications using a plurality of channels, a communication apparatus of a network probes the presence of other networks, requests other communication apparatuses of the network to make communication using the plurality of channels based on the probe result, and makes communication using the plurality of channels based on responses to the request. Upon making communications using neighboring channels, the communication apparatus probes the presence of networks in neighboring channels and channels that neighbor the neighboring channels, and makes communications using a used channel and the neighboring channel.

9 Claims, 10 Drawing Sheets

U.S. PATENT DOCUMENTS

| | | | |
|---|---|---|---|
| 2006/0013184 A1* | 1/2006 | Utsunomiya et al. | 370/343 |
| 2006/0114866 A1* | 6/2006 | Kim et al. | 370/338 |
| 2006/0120302 A1* | 6/2006 | Poncini et al. | 370/254 |
| 2006/0153133 A1* | 7/2006 | Zhong | 370/331 |
| 2006/0159003 A1 | 7/2006 | Nanda et al. | |
| 2006/0182076 A1* | 8/2006 | Wang | 370/338 |
| 2006/0242457 A1* | 10/2006 | Roy et al. | 714/12 |
| 2007/0133473 A1* | 6/2007 | Takagi et al. | 370/334 |
| 2007/0230421 A1* | 10/2007 | Roadknight | 370/338 |

FOREIGN PATENT DOCUMENTS

| | | |
|---|---|---|
| JP | 2000-22712 A | 1/2000 |
| JP | 2006-13820 A | 1/2006 |
| JP | 2006-14258 A | 1/2006 |
| KR | 10-2005-0072686 A | 7/2005 |

OTHER PUBLICATIONS

Sheu, Ming, et al., "Wi-Mesh Alliance (WiMA) proposal IEEE P802.11, IEEE 802.11-05/575r1", Jul. 20, 2005, pp. 30-81, XP-00249917.

Kose, Cenk, et al., "IEEE P802.11, Wireless LAN, WWiSE proposal: High throughout extension to the 802.11 Standard", Mar. 18, 2005, pp. 10-75, XP-002499188.

Korean Office Action dated Apr. 5, 2011 in corresponding Korean Patent Application No. 10-2009-7020825.

Japanese Office Action dated Nov. 8, 2011 issued in corresponding Japanese Patent Application No. 2007-130436.

Chinese Office Action dated Jan. 18, 2012 issued in corresponding Chinese Patent Application No. 200880016289.9.

* cited by examiner

ALLOCATION OF A SECONDARY BAND TO EXPAND THE CAPACITY OF A PRIMARY BAND IN A WLAN 802.11 SYSTEM

TECHNICAL FIELD

The present invention relates to a communication apparatus and communication method.

BACKGROUND ART

In a wireless LAN of IEEE802.11a/g, terminals in a network share one channel having a 20-MHz bandwidth to communicate with each other. In IEEE802.11n which has been currently standardized, a frequency band (channel) to be used is expanded to attain speeding up.

As a speeding up method, a method of making communications using two neighboring channels, i.e., a 40-MHz bandwidth has been examined. In IEEE802.11n, one of two channels is handled as a main operation channel (master channel) and the other channel is handled as an expansion channel (slave channel). A beacon signal as a reference signal is sent using the master channel.

Japanese Patent Laid-Open No. 2000-022712 discloses a configuration which selects a channel to be used in a wireless communication system that makes communications using one channel.

However, when a frequency band (channel) is expanded without careful consideration, communications of other apparatuses may be disturbed. For example, upon expanding the frequency band, communications of an existing wireless network may be disturbed. An apparatus which belongs to an identical network before expansion of the frequency band may no longer be able to make a communication after expansion of the frequency band.

DISCLOSURE OF INVENTION

The present invention allows realization of prevention of adverse effects due to channel expansion.

According to one aspect of the present invention, a communication apparatus comprises a probe unit configured to probe the presence of other networks upon making a communication using a plurality of channels, a request unit configured to request other communication apparatuses of a network to make the communication using the plurality of channels based on a probe result of the probe unit and an expansion unit configured to make the communication using the plurality of channels based on a response to the request issued by the request unit.

Further features of the present invention will become apparent from the following description of exemplary embodiments with reference to the attached drawings.

BEST MODE FOR CARRYING OUT THE INVENTION

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
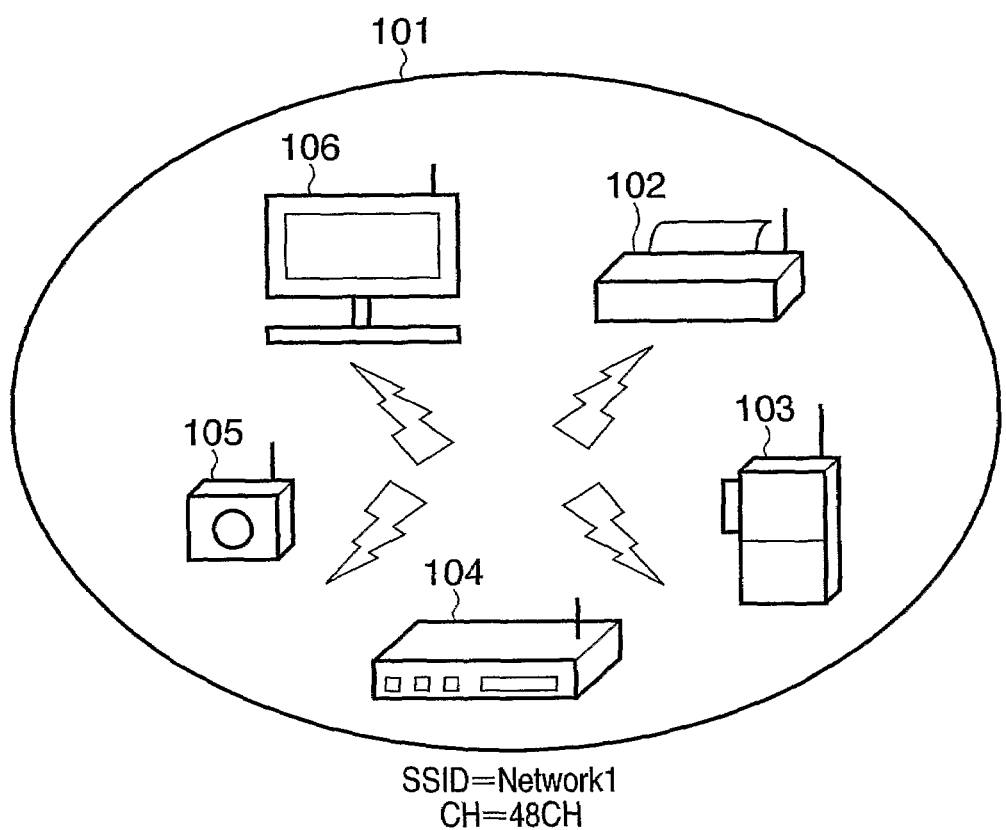
FIG. 1 is a view showing the system configuration according to the first and second embodiments.

FIG. 1 shows an example of the network configuration which is compliant to the IEEE802.11a standard and is configured in the Ad hoc mode. Note that a case will be explained wherein communications are made using eight frequency channels 36CH, 40CH, 44CH, 48CH, 52CH, 56CH, 60CH, and 64CH of those available in the IEEE802.11a standard.

Reference numeral 101 denotes a wireless network which operates to have an SSID (Service Set Identifier)="Network1" as a network identifier using a channel (CH)="48CH". To this network, a plurality of terminals 102 to 106 compliant to the IEEE802.11a and IEEE802.11n standards belong. Reference numerals 102, 103, 104, 105, and 106 respectively denote a printer, a digital video camera (to be abbreviated as DV hereinafter), a storage, a digital still camera (to be abbreviated as DSC hereinafter), and a display. These terminals can directly exchange data via wireless communications.

Figure 10:
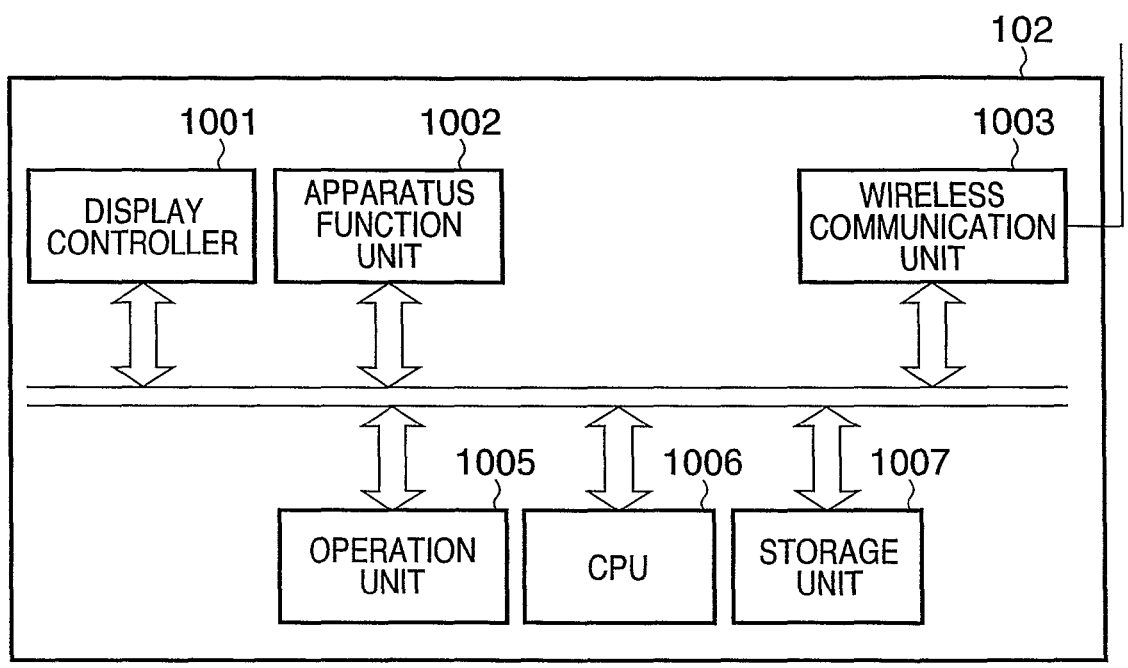
FIG. 10 is a functional block diagram of an apparatus which comprises a wireless communication function.

FIG. 10 is a block diagram of the terminals 102 to 106.

A display processor 1001 controls display contents for the user such as LCD displays, LED indications, audio presentations, and the like and displays such contents as information. A user operation for, e.g., selecting information displayed by the display processor 1001 is made via an operation unit 1005. An apparatus function unit 1002 implements the function depending on each apparatus. For example, in case of the printer 102, the apparatus function unit 1002 serves as a printer function unit, i.e., a printer that outputs images onto paper sheets. In case of the DV 103, the apparatus function unit 1002 serves as a DV function unit, i.e., a digital video camera which captures video pictures. In case of the storage 104, the apparatus function unit 1002 serves as a storage function unit to store large capacity data. In case of the DSC 105, the apparatus function unit 1002 serves as a DSC function unit, i.e., a digital still camera to capture still pictures. In case of the display 106, the apparatus function unit 1002 serves as a display function unit to execute various display processes.

A wireless communication unit 1003 serves to make wireless communications. The wireless communication unit 1003 exchanges radio signals with other wireless communication apparatuses. The wireless communication unit 1003 makes communications compliant to the IEEE802.11 standard. The operation unit 1005 has buttons that allow the user to make various operations. The operation unit 1005 includes a key that allows the user to start the expansion processing of a wireless channel. The display processor 1001 and operation unit 1005 serve as a user interface of the terminals 102 to 106 in this embodiment. A CPU 1006 is a controller for controlling the respective units. Programs controlled by the CPU 1006 are stored in a storage unit 1007 which comprises a RAM, flash ROM, or the like. The storage unit 1007 also stores setting information of wireless communications and the like. Data to be processed by the CPU 1006 are also written in or read out from the storage unit 1007. The operations of the respective terminals (to be described later) are implemented when the CPU 1006 and wireless communication unit 1003 execute processes according to the programs stored in the storage unit 1007.

In this embodiment, the DV 103 and display 106 execute channel expansion processing that makes wireless communications using frequency bands of two neighboring channels. IEEE802.11n has proposed a technique for combining two neighboring channels each having a 20-MHz bandwidth, and making communications using a 40-MHz bandwidth. The channel expansion processing of this embodiment indicates the above processing proposed by IEEE802.11n.

In the network shown in FIG. 1, by expanding channels when, for example, the DV 103 outputs moving picture data to the display 106 to display the moving picture data, vast quantities of data can be stably transmitted. That is, communications are made using the 40-MHz bandwidth for two neighboring channels. One of two channels is handled as a main operation channel (main operation CH) and the other channel is handled as an expansion channel (expansion CH), i.e., a slave channel.

The channel expansion processing to the network which is to be practiced so as to stably transmit moving picture data from the DV 103 to the display 106 will be described below.

Figure 2:
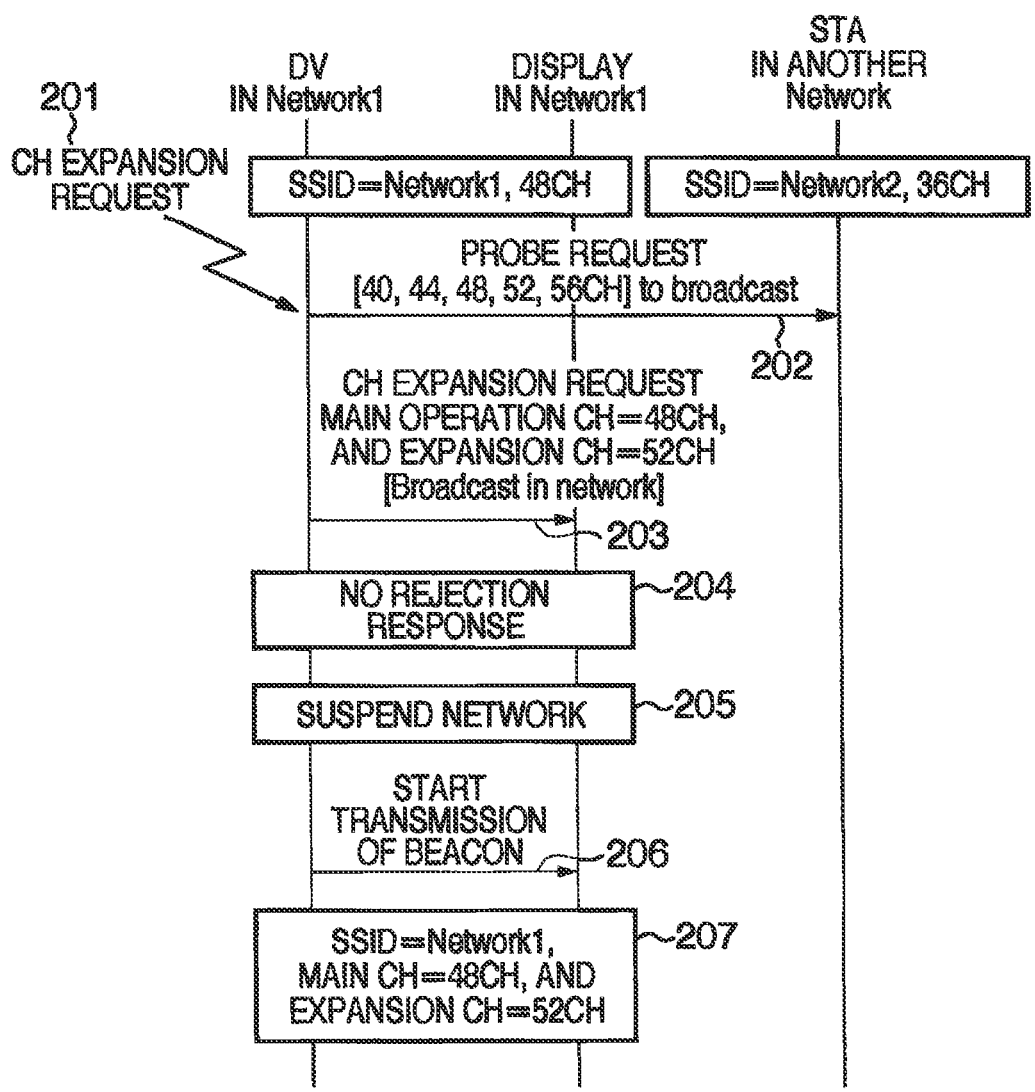
FIG. 2 is a sequence chart according to the first embodiment.
Figure 3:
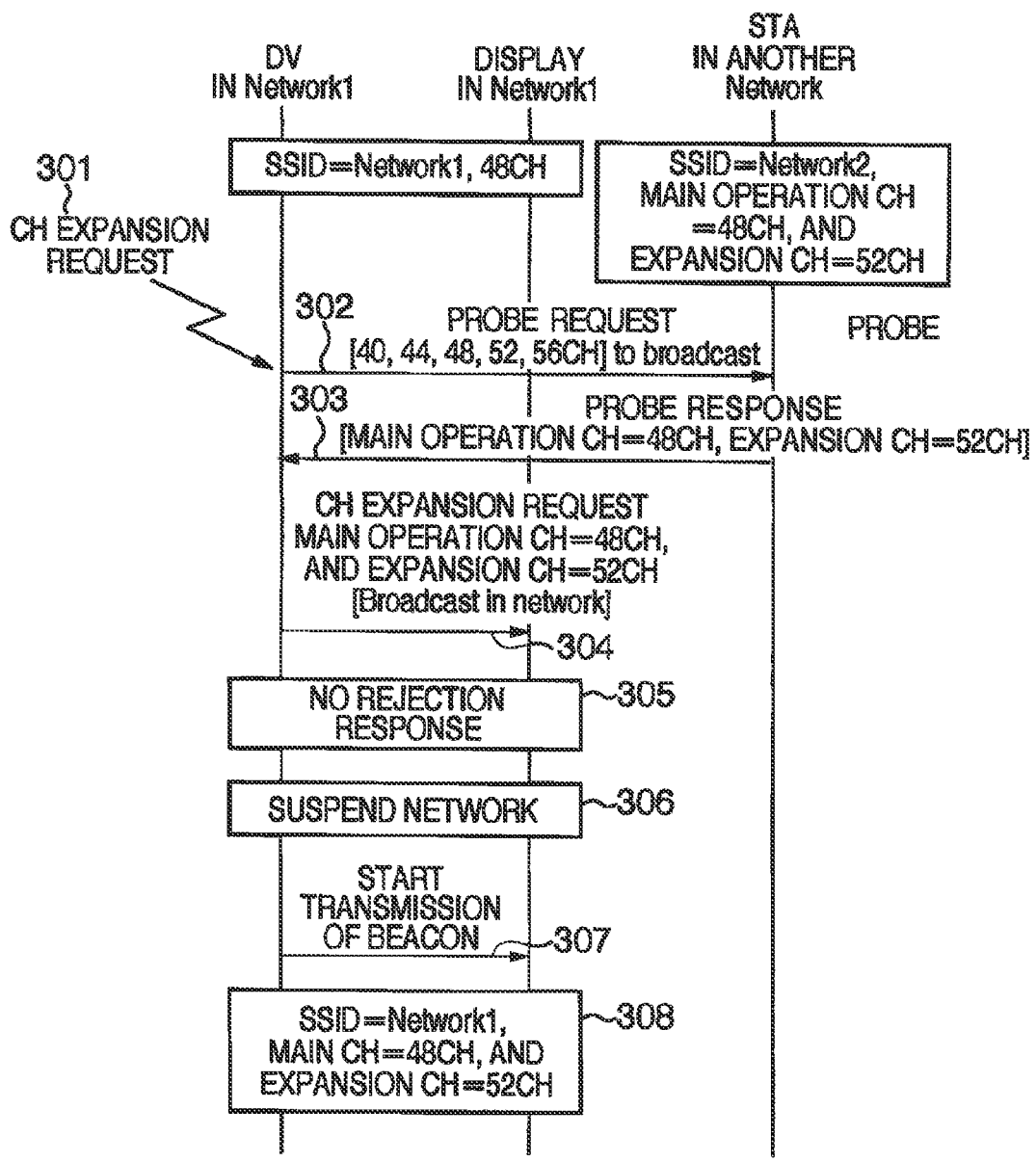
FIG. 3 is a sequence chart according to the first embodiment.
Figure 4:
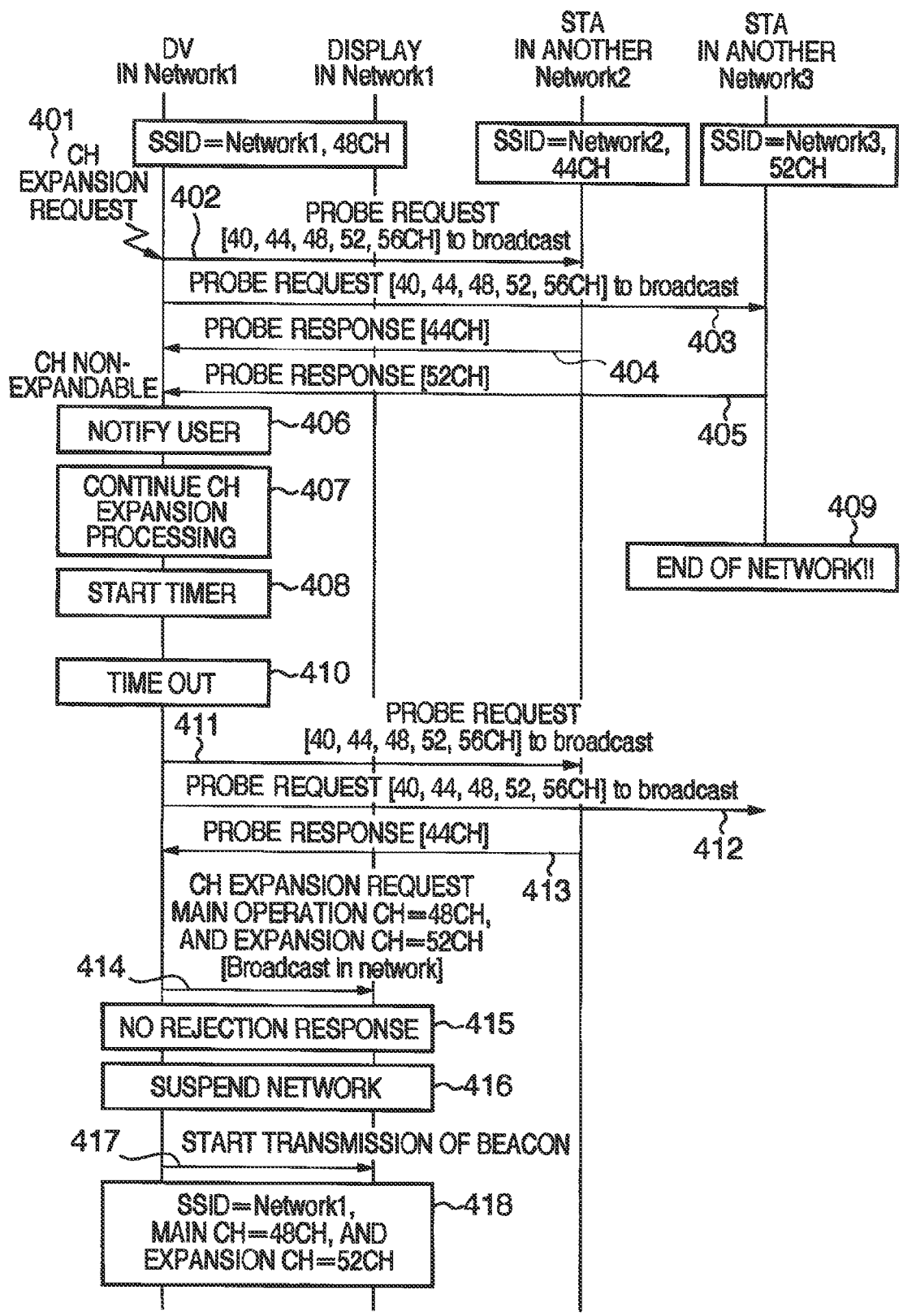
FIG. 4 is a sequence chart according to the first embodiment.
Figure 5:
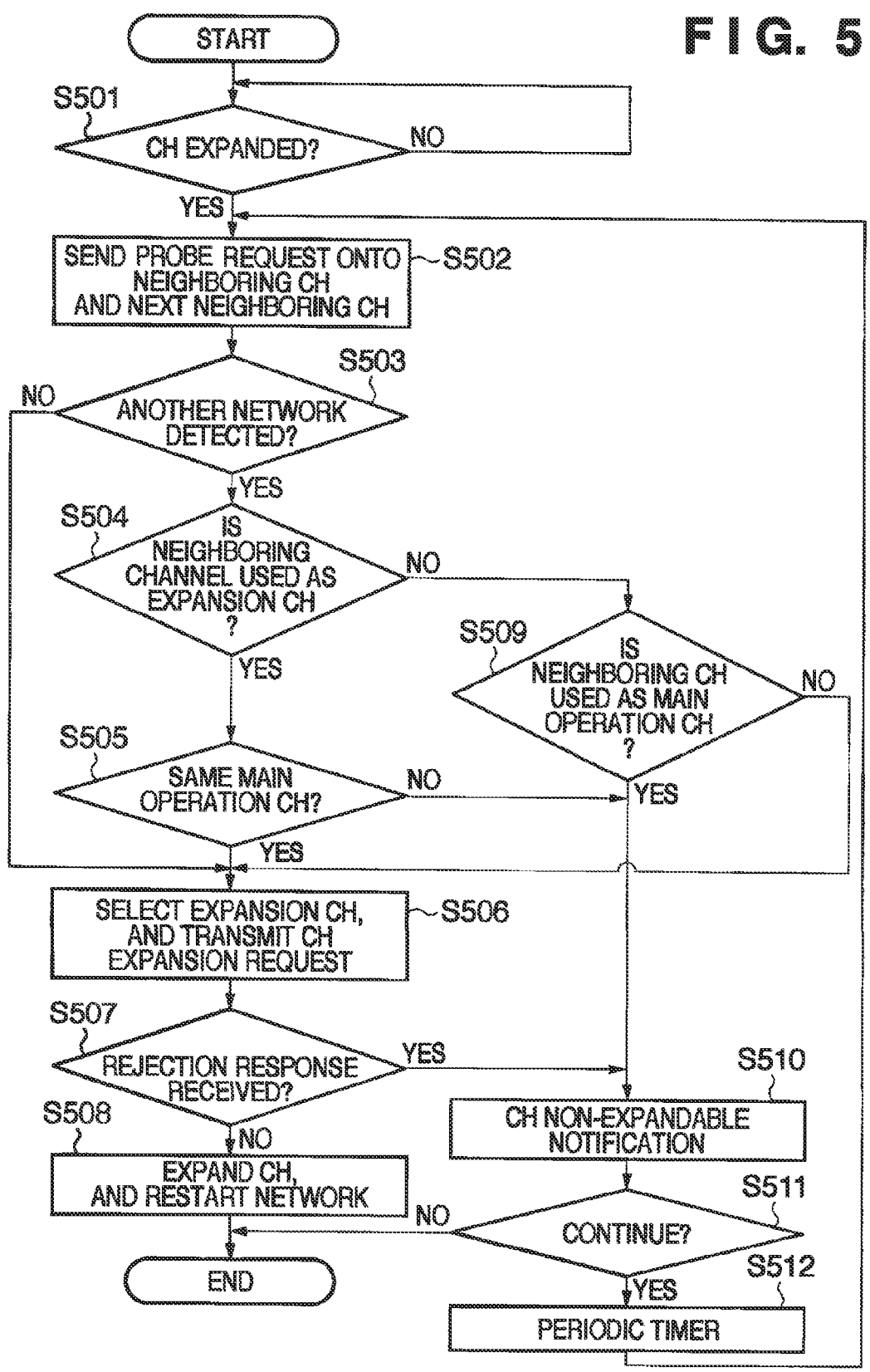
FIG. 5 is an operation flowchart of a DV 103 according to the first embodiment.

FIGS. 2 to 4 are exemplary sequence charts of this embodiment. FIG. 5 is an operation flowchart of the DV 103. The operations shown in FIGS. 2 to 5 are implemented when the CPU 1006 and wireless communication unit 1003 of each apparatus execute processes according to the programs stored in the storage unit 1007.

In FIG. 2, a wireless network to which the DV 103 belongs, and the other wireless network different from that network exist. The wireless network to which the DV 103 belongs operates to have an SSID="Network1" as a network identifier using a channel "48CH". The other wireless network operates to have an SSID="Network2" using a channel "36CH". In the following description, an operation channel before channel expansion is handled as a main operation channel.

The DV 103 joins, using the Ad hoc mode of the IEEE802.11a standard, the wireless network which operates to have the SSID="Network1" as a network identifier using the channel "48CH". In order to stably output moving picture data to the display 106, the DV 103 starts channel expansion processing (201, S501). More specifically, upon detection of a user operation of the key which is provided to the operation unit 1005 and is used to instruct a channel expansion request, the DV 103 starts the channel expansion processing. Alternatively, when it is detected that the user of the DV 103 has selected an operation for outputting moving picture data to the display 106, the DV 103 may automatically start the channel expansion processing.

After the channel expansion processing starts, the DV 103 transmits, onto the operating channel of the wireless network, neighboring channels of the operating channel, and next neighboring channels, a probe request for probing apparatuses on wireless networks, which operate in these channels (202, S502).

In this case, the DV 103 transmits the probe request onto "48CH" as the operating channels, "44CH" and "52CH" as the neighboring channels, and "40CH" and "56CH" as the next neighboring channels (202, S502). This probe request uses a "probe request" signal specified by the IEEE802.11 standard. In place of or parallel to transmission of the probe request, beacons specified by the IEEE802.11 standard may be monitored in the operating channel, neighboring channels, and next neighboring channels to probe the presence of networks which operate in these channels.

The reason why the probe request is transmitted onto "44CH" and "52CH" as the neighboring channels of the operating channel "48CH" is that an expansion channel of the channel expansion processing is assigned to either "44CH" or "52CH". The reason why the probe request is transmitted onto the next neighboring channels "40CH" and "56CH" is that expansion channels of wireless networks which operate to have the channels "40CH" and "56CH" as main operation channels are also assigned to "44CH" and "52CH". Upon transmitting a probe request via an expansion channel, a terminal may not return any response to the probe request although it uses that expansion channel. That is, upon reception of a probe request via a main operation channel, a terminal returns a response. However, upon reception of a probe request via an expansion channel as a slave channel, the terminal does not always return a response. Therefore, when networks which operate to have "40CH" and "56CH" as main operation channels exist, if the probe request is transmitted onto "44CH" and "52CH" as their expansion channels, terminals do not always return responses. For this reason, in this embodiment, the probe request is transmitted onto the next neighboring channels "40CH" and "56CH".

The DV 103 which transmitted the probe request checks based on the presence/absence of responses to the probe request and the response contents whether or not other wireless network exist (to check the presence/absence of apparatuses which operate on other wireless networks).

In the example of FIG. 2, there is no terminal which responds to the probe request transmitted by the DV 103 other than those which belong to the same network as the DV 103. Therefore, in the example of FIG. 2, no response returns from terminals on other networks even when a predetermined period of time has elapsed after transmission of the probe request, and the DV 103 determines that other wireless networks do not exist (S503). In the checking processing in step S503, networks which use the same channel but have different network identifiers (SSIDs) and those which use different channels independently of their SSIDs are determined as other wireless networks. Also, in the example of FIG. 2, the wireless network which operates to have the network identifier="Network2" using the channel "36CH" exists, but no response to the probe request transmitted in step S502 returns. For this reason, the DV 103 determines that other wireless networks do not exist. In other words, the DV 103 checks the presence/absence of influencing wireless networks after channel expansion (i.e., those to or from which an adverse effect is exerted or received).

If the DV 103 determines that other wireless network do not exist, it selects an expansion channel, and transmits (broadcasts) a "channel expansion request" indicating the main operation channel and expansion channel to all terminals in the wireless network to which the DV 103 itself belongs (203, S506). In this case, the DV 103 transmits (broadcasts) the "channel expansion request" to have "48CH" as the main operation channel and "52CH" as the expansion channel (203, S506). Note that the DV 103 selects "52CH" as the expansion channel.

If no rejection response to the expansion request transmitted by the DV 103 returns from all the terminals in the same network as the DV 103 after an elapse of a predetermined period of time (204, S507), the DV 103 expands the channels and restarts the wireless network (205, 206, 207, S508). Other terminals which received the channel expansion request execute processing for suspending the wireless network used so far for the purpose of channel expansion (205). The DV 103 which expanded the channels and restarted the network configures a new wireless network using the SSID="Network1", the main operation channel="48CH", and the expansion channel="52CH". That is, the DV 103 starts transmission of a beacon signal including these pieces of information (206, 207, S508). Upon confirmation of the beacon signal, other terminals which belonged to the previous wireless network that operated to have the SSID="Network1" using the channel "48CH" execute processing to join the newly reconfigured wireless network (207). That is, the channel expansion request transmitted by the DV 103 may be an inquiry signal that inquires as to whether or not to expand channels.

If a rejection response is sent from another terminal in the same network in response to the expansion request, the process advances to step S510 to be described later.

A case will be explained with reference to FIGS. 3 and 5 wherein a response to the probe request transmitted by the DV 103 returns.

In FIG. 3, a wireless network to which the DV 103 belongs, and another wireless network different from that network exist. The wireless network to which the DV 103 belongs operates to have an SSID="Network1" as a network identifier using a channel "48CH". The other wireless network operates to have an SSID="Network2" as a network identifier using a main operation channel "48CH" and an expansion channel "52CH".

As in FIG. 2, the DV 103 starts channel expansion processing so as to stably output moving picture data to the display 106 (301, S501).

Upon starting the channel expansion processing, the DV 103 transmits, onto the operating channel of the wireless network, neighboring channels, and next neighboring channels, a probe request that probes the presence of other wireless networks using these channels (302, S502). In this case, the DV 103 transmits the probe request onto "48CH" as the operating channels, "44CH" and "52CH" as the neighboring channels, and "40CH" and "56CH" as the next neighboring channels (302, S502). Note that the processes executed so far are the same as those described using FIG. 2.

In FIG. 3, the other wireless network which operates to have the SSID="Network2" as a network identifier using the main operation channel "48CH" and expansion channel "52CH" exists. Therefore, the DV 103 receives a probe response to the probe request transmitted onto the channel "48CH" (303). This response is transmitted by a terminal which operates on the other wireless network, and includes information associated with the network on which that terminal operates. The DV 103 interprets the response contents to determine whether the other wireless network exists. In the example of FIG. 3, the response includes information indicating that the network operates using the main operation channel "48CH" and expansion channel "52CH". The DV 103 receives and interprets this response to determine the presence of the other wireless network (303, S503). If the other wireless network exists, the DV 103 further checks based on the interpretation result whether or not that network executes channel expansion, and determines the main operation channel and expansion channel if the channel expansion is executed. Then, the DV 103 checks if the other wireless network uses the neighboring channel of the channel currently used by the DV 103 as an expansion channel (S504). If the other network uses the neighboring channel as an expansion channel, the DV 103 checks if the main operation channel of that network is the same as the operation channel of the DV 103 (S505). If the main operation of the other network is the same as the operation channel of the DV 103, the DV 103 selects the same expansion channel as the other network, transmits a channel expansion request (S506), and executes the aforementioned processes in steps S507 and S508. If the main operation channel of the other network is not the same as the operation channel of the DV 103, the process advances to step S510 to be described later.

The reason why the DV 103 selects the same expansion channel as its expansion channel when the other wireless network uses the same channel as the operation channel as a main operation channel, and the neighboring channel of the DV 103 as an expansion channel will be described below.

Assume that the DV 103 executes the channel expansion processing using "44CH" as an expansion channel from which the presence of another wireless network is not confirmed. In this case, three channels "44CH", "48CH", and "52CH" are used together with the above other wireless network (SSID="Network2"). Furthermore, since the main operation channel "48CH" overlaps on the two networks, it cannot be simultaneously used. That is, while the network with the SSID="Network2" is transmitting and receiving data, the network with the SSID="Network1", i.e., the DV 103 can execute neither transmission nor reception of data. During a period in which the DV 103 can execute neither transmission nor reception of data, the DV 103 cannot use the non-overlapping channel "44CH", either. Therefore, limited channels are wastefully used. Such situation imposes considerable adverse influences on other networks which may operate in the future.

When the main operation channel is the same, if the DV 103 selects the same channel as an expansion channel, a channel which is used by neither of the two networks due to data transmission and reception of one network can be prevented from being formed. Therefore, the DV 103 transmits a channel expansion request to have the main operation channel "48CH" and expansion channel "52CH" in the same manner as the network with the SSID="Network2" (304 to 308, S506).

If it is determined in step S504 that the other confirmed wireless network does not use the neighboring channel of the DV 103 as an expansion channel, the DV 103 checks if that network uses the neighboring channel as a main operation channel (S509). If the other confirmed wireless network uses the neighboring channel as a main operation channel, the process advances to step S510 (to be described later). As a result of checking in step S509, if the other confirmed wireless network does not use the neighboring channel as a main operation channel, it does not use the neighboring channel of the DV 103. Hence, the process advances to the aforementioned processes in step S506 and subsequent steps to transmit a channel expansion request.

A case will be described below with reference to FIGS. 4 and 5 wherein no expandable channel is available.

In FIG. 4, a wireless network to which the DV 103 belongs, and two wireless networks different from that network exist. The wireless network to which the DV 103 belongs operates to have an SSID="Network1" as a network identifier using a channel "48CH". One (another network 2) of other wireless networks operates to have an SSID="Network2" as a network identifier using an operation channel "44CH". The other wireless network (another network 3) operates to have an SSID="Network3" as a network identifier using an operation channel "52CH".

The DV 103 starts channel expansion processing so as to stably output moving picture data to the display 106 (401, S501).

Upon starting the channel expansion processing, the DV 103 transmits, onto "40CH", "44CH", "48CH", "52CH", and "56CH", a probe request that probes the presence of other networks that operate using these channels (402, 403, S502).

In the example of FIG. 4, since responses return from terminals of other networks 2 and 3, the DV 103 receives a plurality of probe responses (404, 405). Furthermore, the DV 103 confirms based on the contents of these responses the presences of other wireless networks which operate using "44CH" and "52CH" as the neighboring channels of the wireless network of the DV 103 (404, 405, S503).

In this case (FIG. 4), since other networks 2 and 3 do not use the neighboring channels of the DV 103 as neighboring channels (S504) but they use them as main operation channels (S509), the process advances to step S510. Step S510 is reached when the DV 103 imposes adverse influences on existing wireless networks if it executes channel expansion (NO in S505, YES in S509) or when a rejection response to the expansion request transmitted in step S506 returns.

In step S510, the DV 103 displays a message using the display processor 1001 to notify the user that the channel expansion cannot be done (406, S510). The user selects if the channel expansion processing is to be continued again or to end, and inputs the selection result via the operation unit 1005. The DV 103 checks this input result (407, S511). If the user selects to end the channel expansion processing without continuing it (S511), the DV 103 abandons the channel expansion, and makes data communications using the current network intact.

To continue the channel expansion processing, the DV 103 starts a periodic timer that measures a predetermined period of time (408, S512). If the periodic timer reaches a time-out (410), the process returns to step S502, and the DV 103 repeats the aforementioned operations. In the example of FIG. 4, the DV 103 re-transmits, onto "40CH", "44CH", "48CH", "52CH", and "56CH", a probe request that probes the presence of other networks that operate using these channels (411, 412, S502).

In the example of FIG. 4, since another network 3 has disappeared at that time, a terminal of another network 2 returns a response. Therefore, the DV 103 advances the process from step S503 to step S504 in FIG. 5, and then from step S504 to step S509. In step S509, since the neighboring channel "52CH" which is not used as a main operation channel exists due to disappearance of another network 3, the process advances to step S506 to transmit a channel expansion request. In case of FIG. 4, since "44CH" as the neighboring channel of the DV 103 has already been used as a main operation channel, the DV 103 selects "52CH" as an expansion channel, and transmits a channel expansion request.

As described above, even when there is no wireless network that uses a channel to be expanded, a terminal (expansion terminal) that executes expansion processing transmits a channel expansion request including information indicating a main operation channel and expansion channel to other terminals which belong to the network before expansion. When no rejection response to the request returns, the expansion terminal expands the channels and reconfigures the network. In this way, by inquiring terminals in the same network as to whether to permit or reject channel expansion, adverse effects on other terminals as a result of channel expansion can be prevented.

The expansion terminal transmits a probe request onto next neighboring channels which may use the channels to be expanded (neighboring channels) as expansion channels in addition to the channels to be expanded, thus confirming other networks that use the neighboring channels. Therefore, even when a terminal which received the probe request does not return any response if it receives the probe request in an expansion channel, the presence of networks using the expansion channels can be confirmed. Since the expansion terminal does not transmit the probe request onto non-related channels, generation of an unnecessary traffic can be prevented.

When the terminal expands the channels, adverse influences on other existing wireless networks can be prevented. As a result, the user's convenience can be improved.

Even when another wireless network which operates using the neighboring channel exists, if the main operation channel of that wireless network is the same as the self wireless network, other adverse influences can be prevented from being imposed on the other existing wireless network due to channel expansion.

If channel expansion cannot be executed, the expansion terminal confirms the user if the channel expansion is to be continued, and obeys the decision made by the user. Therefore, the probability of channel expansion can be improved.

Second Embodiment

The second embodiment will explain a case in which a probe request is transmitted onto all available channels (36CH, 40CH, 44CH, 48CH, 52CH, 56CH, 60CH, and 64CH). Since the network configuration and the arrangement of each terminal according to the second embodiment are the same as those in the first embodiment (FIGS. 1 and 10), a repetitive description thereof will be avoided.

In this embodiment as well, a case will be explained wherein a DV 103 executes channel expansion processing.

Figure 6:
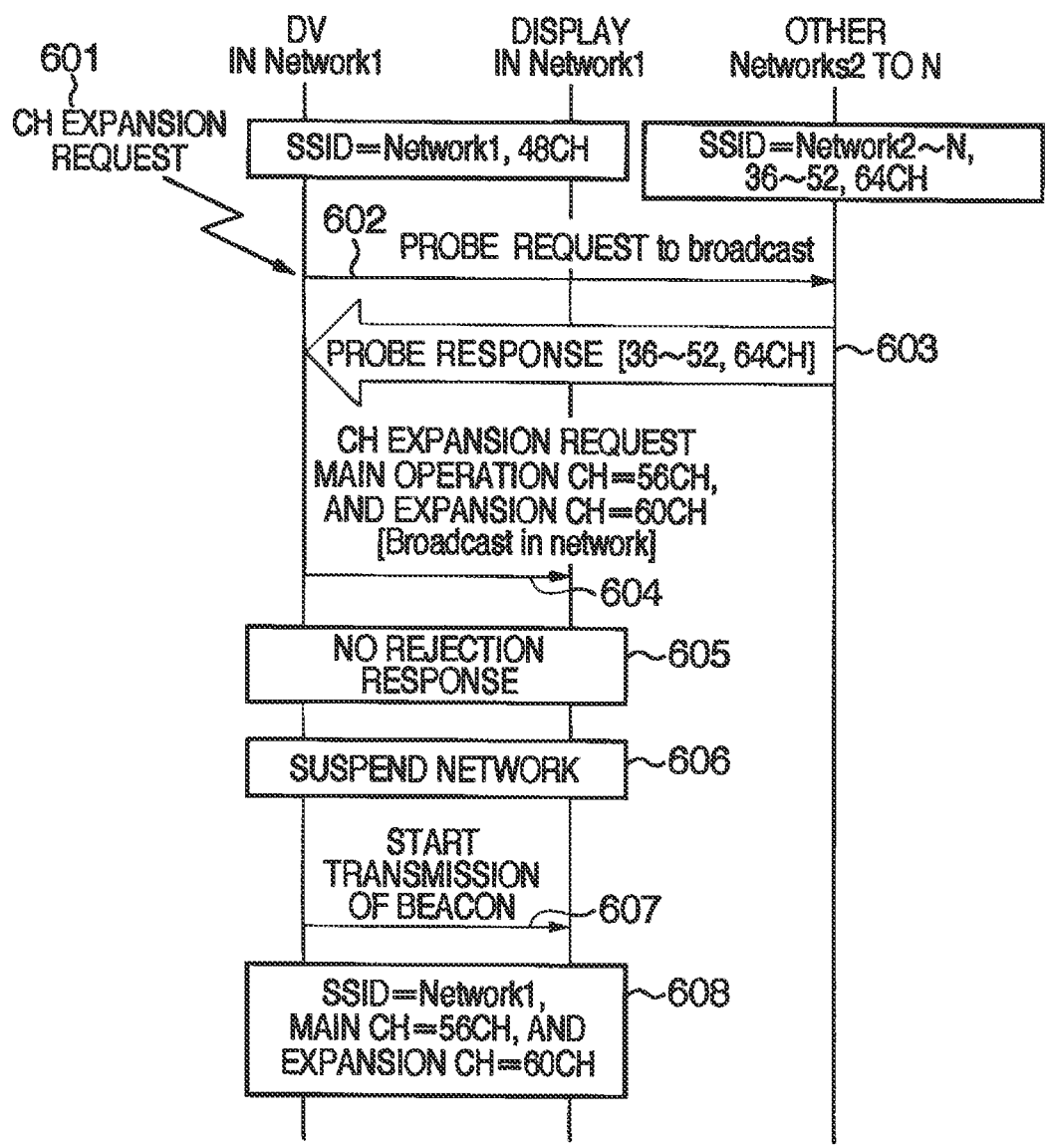
FIG. 6 is a sequence chart according to the second embodiment.
Figure 7:
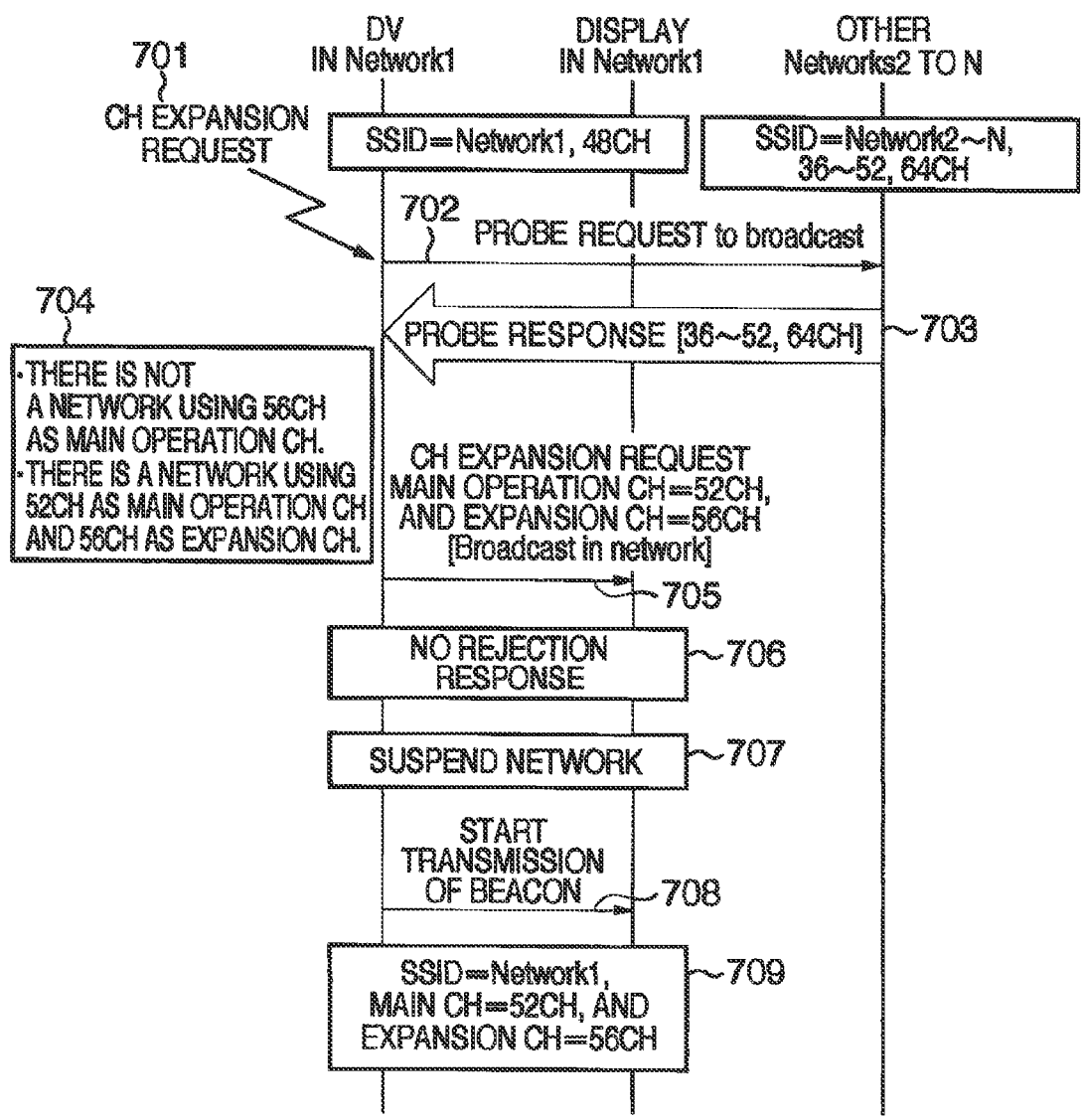
FIG. 7 is a sequence chart according to the second embodiment.
Figure 8:
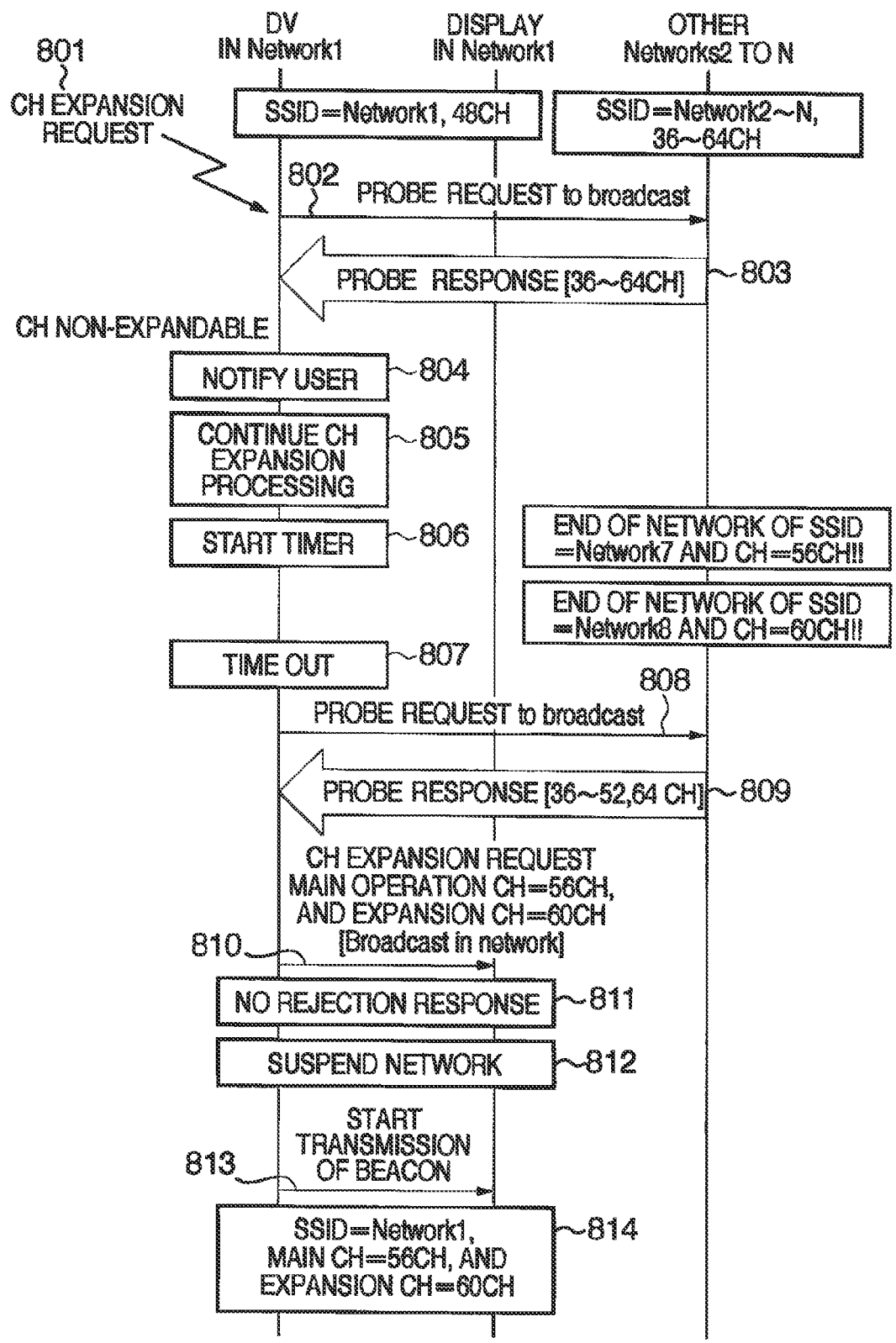
FIG. 8 is a sequence chart according to the second embodiment.
Figure 9:
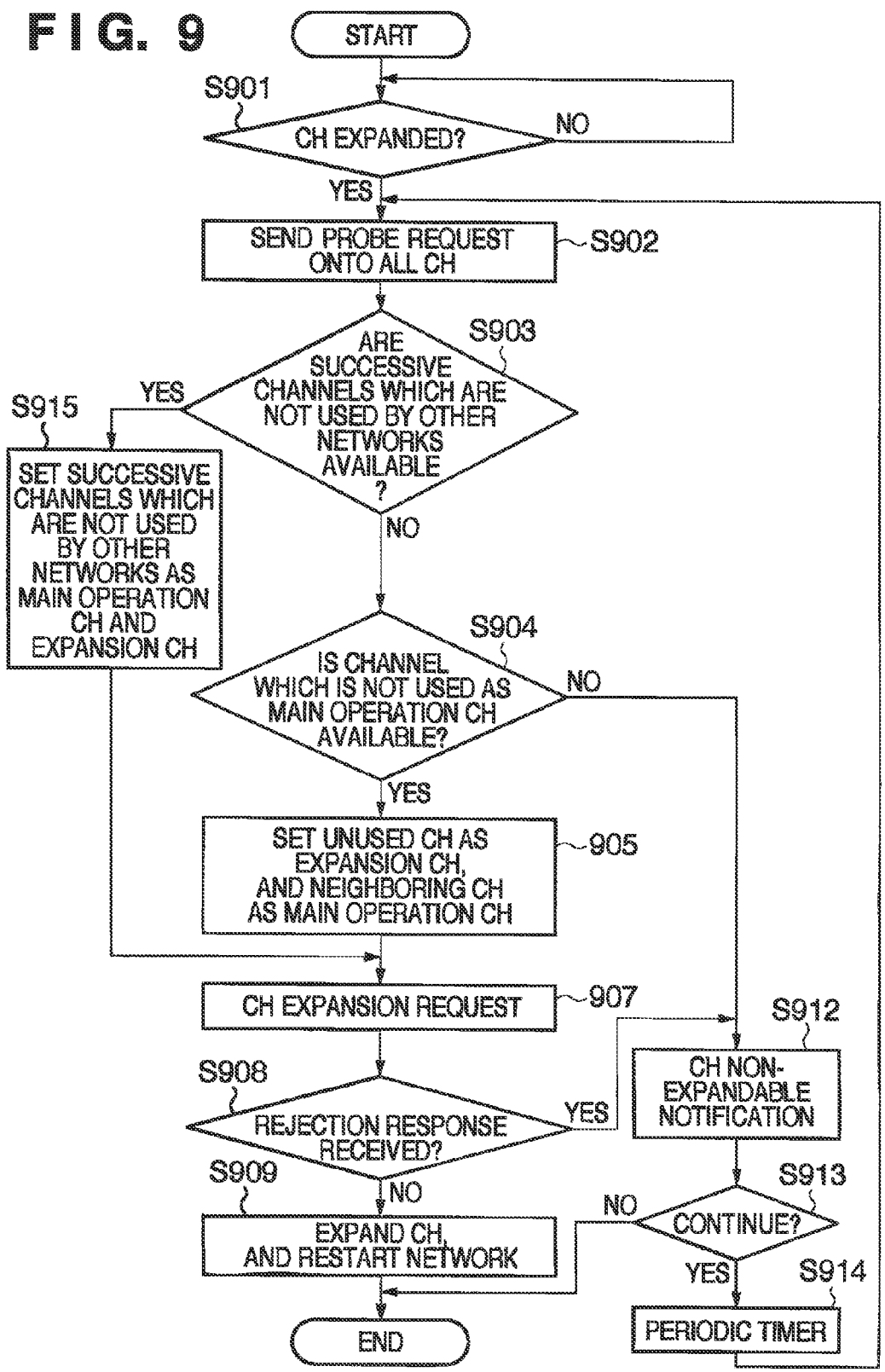
FIG. 9 is an operation flowchart of a DV 103 according to the second embodiment.

FIG. 9 is an operation flowchart of the DV 103 of this embodiment. FIGS. 6 to 8 are exemplary sequence charts of this embodiment. The operations shown in FIGS. 6 to 9 are implemented when a CPU 1006 and wireless communication unit 1003 of each apparatus execute processes according to programs stored in a storage unit 1007.

In FIG. 6, a wireless network to which the DV 103 belongs, and a plurality of wireless networks different from that network exist. The wireless network to which the DV 103 belongs operates to have an SSID="Network1" as a network identifier using a channel "48CH". Other wireless networks exist in all channels except for channels "56CH" and "60CH". For example, one of other wireless networks operates to have an SSID="Network2" as a network identifier using a channel "36CH". Another wireless network operates to have an SSID="Network3" as a network identifier using a main operation channel "40CH". Another wireless network operates to have an SSID="Network4" as a network identifier using a main operation channel "44CH". Another wireless network operates to have an SSID="Network5" as a network identifier using a main operation channel "48CH". Another wireless network operates to have an SSID="Network6" as a network identifier using a main operation channel "52CH". Another wireless network operates to have an SSID="Network7" as a network identifier using a main operation channel "64CH". In the following description, an operation channel before channel expansion is handled as a main operation channel.

The DV 103 joins, using the Ad hoc mode of the IEEE802.11a standard, the wireless network which operates to have the SSID="Network1" as a network identifier using the channel "48CH". In order to stably output moving picture data to the display 106, the DV 103 starts channel expansion processing (601, S901). More specifically, upon detection of a user operation of a key which is provided to an operation unit 1005 and is used to instruct a channel expansion request, the DV 103 starts the channel expansion processing. Alternatively, when it is detected that the user of the DV 103 has selected an operation for outputting moving picture data to the display 106, the DV 103 may automatically start the channel expansion processing.

Upon starting the channel expansion processing, the DV 103 transmits, onto the all available channels of wireless networks, a probe request for probing the presence of other wireless networks (602, S902). This probe request uses a "probe request" signal specified by the IEEE802.11 standard. In place of or parallel to transmission of the probe request, beacons specified by the IEEE802.11 standard may be monitored in all the channels to probe the presence of other networks.

The DV 103 which transmitted the probe request checks based on the presence/absence of responses to the probe request and the response contents whether or not other wireless networks exist. Then, the DV 103 checks if successive channels which are not used by other networks are available (S903). In the example of FIG. 6, other wireless networks exist in all the channels except for the channels "56CH" and "60CH". Therefore, in the example of FIG. 6, the DV 103 receives probe responses in all the channels except for the channels "56CH" and "60CH" in response to the probe request transmitted onto all the channels (603). Also, none of the existing networks expand channels. Therefore, the DV 103 can confirm the absence of other networks in successive channels "56CH" and "60CH" (S903). If the DV 103 confirms the presence of successive channels which are not used by other networks, it selects one of the successive channels which are not used by other networks as a main operation channel, and the other channel as an expansion channel (S915). In order to execute channel expansion using these channels, the DV 103 transmits (broadcasts) a channel expansion request to all terminals within the wireless network to which the DV 103 itself belongs (604, S907).

For example, when the DV 103 selects a main operation channel "56CH" and expansion channel "60CH", it transmits a "channel expansion request" to have the main operation channel "56CH" and expansion channel "60CH" (604, S915, S907). Note that a main operation channel "60CH" and expansion channel "56CH" may be selected.

If no rejection response to the expansion request transmitted by the DV 103 returns from all the terminals in the same network as the DV 103 after an elapse of a predetermined period of time (605, S908), the DV 103 expands the channels and restarts the wireless network (606, 607, 608, S909). Other terminals which received the channel expansion request execute processing for suspending the wireless network used so far for the purpose of channel expansion (606). The DV 103 which expanded the channels and restarted the network configures a new wireless network using the SSID="Network1", the main operation channel="56CH", and the expansion channel="60CH". That is, the DV 103 starts transmission of a beacon signal including these pieces of information onto the new wireless network (607, S909). Terminals which belonged to the previous wireless network that operated to have the SSID="Network1" using the channel "48CH" transit to the main operation channel designated by the received channel expansion request, and monitor the beacon. Upon confirmation of the beacon signal from the DV 103 that transmitted the channel expansion request, the terminals execute processing to join the new wireless network reconfigured by the DV 103 (608).

If a rejection response is sent from another terminal in the same network in response to the expansion request, the process advances to step S912 to be described later.

A case will be described below with reference to FIGS. 7 and 9 wherein only one channel, which is not used as a main operation channel, is available.

In FIG. 7, a wireless network to which the DV 103 belongs, and wireless networks different from that network exist. The wireless network to which the DV 103 belongs operates to have an SSID="Network1" as a network identifier using a channel "48CH". A plurality of other wireless networks use all channels except for a channel "56CH" as main operation channels. For example, one of other wireless networks operates to have an SSID="Network2" as a network identifier using a channel "36CH". Another wireless network operates to have an SSID="Network3" as a network identifier using a main operation channel "40CH". Another wireless network operates to have an SSID="Network4" as a network identifier using a main operation channel "44CH". Another wireless network operates to have an SSID="Network5" as a network identifier using a main operation channel "48CH". Another wireless network operates to have an SSID="Network6" as a network identifier using a main operation channel "52CH". Another wireless network operates to have an SSID "Network7" as a network identifier using a main operation channel "60CH". Another wireless network operates to have an SSID="Network8" as a network identifier using a main operation channel "64CH". Furthermore, assume that the network which operates to have the SSID="Network6" as a network identifier using the main operation channel "52CH" uses a channel "56CH" as an expansion channel.

The DV 103 joins, using the Ad hoc mode of the IEEE802.11a standard, the wireless network which operates to have the SSID="Network1" as a network identifier using the channel "48CH". As in FIG. 6, in order to stably output moving picture data to the display 106, the DV 103 starts channel expansion processing (701, S901).

Upon starting the channel expansion processing, the DV 103 transmits, onto the all available channels of wireless networks, a probe request for probing the presence of other wireless networks (702, S902). Note that the processes executed so far are the same as those described using FIG. 6.

In the example of FIG. 7, the main operation channels exist in all the channels except for the channel "56CH" (i.e., the networks which operates using respective channels except for "56CH" as main operation channels exist). The channel "56CH" is used, as an expansion channel, by the network which operates to have the SSID="Network6" as a network identifier using the main operation channel "52CH". Therefore, in the example of FIG. 7, a plurality of responses to the probe request return from a plurality of terminals which belong to other networks. More specifically, in response to the probe request transmitted onto all the channels, the DV 103 receives probe responses in all the channels except for the channel "56CH" (703). Based on these responses, the DV 103 determines that there are no successive channels which are not used by other networks (S903). Furthermore, the DV 103 checks if a channel which is not used as a main operation channel is available (S904). As a result, the DV 103 confirms that the channel "56CH" is not used as a main operation channel (S904). Each response to the probe request includes information associated with another network to which a terminal that transmitted the response belongs. That is, in the example of FIG. 7, the DV 103 interprets the contents of these responses and can recognize that another wireless network using the main operation channel "52CH" and expansion channel "56CH" exists (704). For the same reason as that described in the first embodiment, the DV 103 sets "52CH" as a main operation channel and "56CH" as an expansion channel (S905), and advances the process to those in step S907 and subsequent steps described above to transmit a channel expansion request (705, S907). That is, the DV 103 sets a channel which is not used as a main operation channel as an expansion channel, and sets its neighboring channel as a main operation channel (S905), and transmits a channel expansion request (705, S907).

If no rejection response to the expansion request transmitted by the DV 103 returns from all the terminals in the same network as the DV 103 after an elapse of a predetermined period of time (706, S908), the DV 103 expands the channels and restarts the wireless network (707, 708, 709, S909). Other terminals which received the channel expansion request execute processing for suspending the wireless network used so far for the purpose of channel expansion (707). The DV 103 which expanded the channels and restarted the network configures a new wireless network using the SSID="Network1", the main operation channel="52CH", and the expansion channel="56CH". That is, the DV 103 starts transmission of a beacon signal including these pieces of information onto the new wireless network (708, S909). Other terminals which belonged to the previous wireless network that operated to have the SSID="Network1" using the channel "48CH" transit to the main operation channel designated by the received channel expansion request, and monitor the beacon. Upon confirmation of the beacon signal from the DV 103 that transmitted the channel expansion request, the terminals execute processing to join the new wireless network reconfigured by the DV 103 (709).

If a rejection response is sent from another terminal in the same network in response to the expansion request, the process advances to step S912 to be described later.

Note that the case has been described using FIG. 7 wherein the channel "56CH" is used as an expansion channel. A case (not shown) will be explained below wherein "56CH" is not used as an expansion channel.

The processes executed until the DV 103 transmits, onto the all available channels of wireless networks, a probe request for probing the presence of other wireless networks (S902) are the same as those described using FIG. 7. That is, the DV 103 receives responses from terminals which belong to other networks. More specifically, the DV 103 receives probe responses in all the channels except for the channel "56CH" in response to the probe request transmitted onto all the channels. By interpreting the received responses, the DV 103 determines that successive channels which are not used by other networks are not available (S903). Also, the DV 13 confirms that the channel "56CH" which is not used as a main operation channel is available (S904). Furthermore, the DV 103 confirms that the channel "56CH" is not used as an expansion channel, either. For the reason described in the first embodiment, channels need to be efficiently used. More specifically, even when the unused channel "56CH" is used as a main operation channel, an expansion channel "52CH" or "60CH" overlaps the main operation channel of another network, and data contention occurs in the overlapping channel. For this reason, even when the unused channel "56CH" is set as a main operation channel, channels cannot be efficiently used. Therefore, a neighboring channel "52CH" or "60CH" of the unused channel "56CH" is set as a main operation channel, and "56CH" is set as an expansion channel (S905). With this setting, the channel expansion processing can be executed without imposing any adverse influences on other networks. After that, the process advances to those in step S907 and subsequent steps to transmit a channel expansion request.

A case will be described below with reference to FIGS. 8 and 9 wherein no expandable channel is available.

In FIG. 8, a wireless network to which the DV 103 belongs, and wireless networks different from that network exist. The wireless network to which the DV 103 belongs operates to have an SSID="Network1" as a network identifier using a channel "48CH". Other wireless networks use all channels as main operation channels. For example, one of other wireless networks operates to have an SSID="Network2" as a network identifier using a channel "36CH". Another wireless network operates to have an SSID="Network3" as a network identifier using a main operation channel "40CH". Another wireless network operates to have an SSID="Network4" as a network identifier using a main operation channel "44CH". Another wireless network operates to have an SSID="Network5" as a network identifier using a main operation channel "48CH". Another wireless network operates to have an SSID="Network6" as a network identifier using a main operation channel "52CH". Another wireless network operates to have an SSID="Network7" as a network identifier using a main operation channel "56CH". Another wireless network operates to have an SSID="Network8" as a network identifier using a main operation channel "60CH". Another wireless network operates to have an SSID="Network9" as a network identifier using a main operation channel "64CH".

The DV 103 joins, using the Ad hoc mode of the IEEE802.11a standard, the wireless network which operates to have the SSID="Network1" as a network identifier using the channel "48CH". As in FIGS. 6 and 7, in order to stably output moving picture data to the display 106, the DV 103 starts channel expansion processing (801, S901).

Upon starting the channel expansion processing, the DV 103 transmits, onto the all available channels of wireless networks, a probe request for probing the presence of other wireless networks (802, S902). Note that the processes executed so far are the same as those described using FIGS. 6 and 7.

In the example of FIG. 8, other networks exist in all the channels. That is, the DV 103 receives a plurality of responses from a plurality of terminals which belong to other networks. More specifically, the DV 103 receives probe responses in all the channels (803).

In this case (FIG. 8), since other networks exist in all the channels, no successive channels which are not used by other networks are available (S903). Hence, the DV 103 advances the process to step S904. In step S904, the DV 103 determines that no channel which is not used as a main operation channel is available, and the process advances to step S912.

The process in step S912 is performed when the DV 103 is expected to impose adverse influences on existing wireless networks if it executes channel expansion or when a rejection response to the expansion request transmitted in step S908 returns.

In step S912, the DV 103 displays a message using a display processor 1001 to notify the user that the channel expansion cannot be done (804, S912). The user selects if the channel expansion processing is to continue again or to end, and inputs the selection result via an operation unit 1005. The DV 103 checks this input result. If the user selects to end the channel expansion processing without continuing it (S913), the DV 103 abandons the channel expansion, and makes data communications using the current network intact.

If the channel expansion processing is to be continued (805, S913), the DV 103 starts a periodic timer that measures a predetermined period of time (806, S914). If the periodic timer reaches a time-out (807), the process returns to step S902, and the DV 103 repeats the aforementioned operations. In the example of FIG. 8, the DV 103 re-transmits, onto all the channels, a probe request that probes the presence of other networks that operate using these channels (808, S902).

In the example of FIG. 8, the network having the SSID="Network7" and using the main operation channel "56CH" and that having the SSID="Network8" and using the main operation channel "60CH" have disappeared at that time. Therefore, the DV 103 receives probe responses in channels except for the channels "56CH" and "60CH" in response to the probe request transmitted onto all the channels (809). That is, since successive channels which are not used by other networks are available (S903), the DV 103 selects "56CH" as a main operation channel and "60CH" as an expansion channel. Then, the process advances from step S903 in FIG. 9 to steps S915 and S907 to transmit a channel expansion request. Note that "60CH" may be selected as a main operation channel, and "56CH" may be selected as an expansion channel. After that, the process advances to those in steps S908 and subsequent steps.

In this embodiment as well, the processing is executed under the assumption that an apparatus which expands channels does not always return a probe response to a probe request received via an expansion channel. However, even if an apparatus which returns a probe response to a probe request received via an expansion channel is available, the processing shown in FIG. 9 can be applied. That is, an apparatus (DV 103) which transmitted the probe request interprets the contents of the probe response to the probe request received via the expansion channel, and can confirm the presence of successive channels which are not used by other networks, and the presence of a channel which is not used as a main operation channel.

As described above, even when successive channels which are not used by other wireless networks are available, i.e., when channel expansion can be executed, an expansion terminal transmits a channel expansion request including information indicating a main operation channel and expansion channel to other terminals which belong to the network before expansion. If no rejection returns in response to the above request, the expansion terminal reconfigures a network using the expandable channels. In this way, by inquiring terminals in the same network as to whether to permit or reject channel expansion, adverse effects on other terminals as a result of channel expansion can be prevented.

When the terminal expands the channels, adverse effects on other existing wireless networks can be prevented. As a result, the user's convenience can be improved.

Even when only one channel which is not used as a main operation channel is available, this channel is used as an expansion channel, and its neighboring channel is used as a main operation channel. With this processing, other adverse influences can be prevented from being imposed on the other existing wireless network due to channel expansion.

If channel expansion cannot be executed, the expansion terminal confirms the user if the channel expansion is to be continued, and obeys the decision made by the user. Therefore, the probability of chance of channel expansion can be improved.

As described above, upon making communications using a plurality of channels, a communication apparatus of a given network probes the presence of other networks, requests other communication apparatuses of that network to make communications using a plurality of channels based on the probe result, and makes communications using a plurality of channels based on responses to the request.

The communication apparatus probes the presence of networks in channels that neighbor its operating channel, thus determining the availability of channels to expand.

The communication apparatus probes the presence of networks in the next neighboring channels of its operating channel. In this way, even when an apparatus which does not respond to a probe signal received via an expansion channel uses the neighboring channel as the expansion channel, the availability of channels to expand can be determined.

Upon confirming the presence of another network, by checking channels used by the other network, channels to be used as a main operation channel and expansion channel can be decided.

When the neighboring channel is used as an expansion channel by another network, and the operating channel is the same as the main operation channel of the other network, the communication apparatus makes communications using a main operation channel and expansion channels in correspondence with those of the other network. In this way, channels can be efficiently used. Even when one neighboring channel is not used as a main operation channel or expansion channel, the neighboring channel used as an expansion channel is used, thus allowing another network to use an unused channel.

When both the neighboring channels are used by other networks as main operation channels, the communication apparatus notifies the user that communications using a plurality of channels cannot be made. As a result, the apparatus can notify the user that channel expansion cannot be executed. Then, the user determines whether or not to continue the channel expansion processing, and can instruct the determination result to the communication apparatus.

Even when neither of the neighboring channels are used by other networks as a main operation channel or expansion channel, one neighboring channel is used as an expansion channel. In this manner, communications using the expanded channels can be made.

The communication apparatus requests other communication apparatuses to make communications using a plurality of channels, and notifies the user that communications using a plurality of channels cannot be made, based on a response to this request. As a result, the apparatus can notify the user that channel expansion cannot be executed. Then, the user determines whether or not to continue the channel expansion processing, and can instruct the determination result to the communication apparatus.

The request of communications using a plurality of channels to other communication apparatuses is issued to indicate channels selected as a main operation channel and expansion channel. In this way, a communication apparatus which received the request can determine whether to reject or accept channel expansion.

When the presence of successive channels which are not used by other networks is confirmed, the communication apparatus makes communications using a plurality of channels by selecting the successive channels which are not used by other networks. In this manner, adverse effects on or from other networks can be prevented.

When a channel which is not used as a main operation channel is available, the communication apparatus selects that channel as an expansion channel, and selects the neighboring channel of the expansion channel as a main operation channel. In this way, channels can be efficiently used.

When no channel which is not used as a main operation channel is available, the communication apparatus notifies the user that communications using a plurality of channels cannot be made. As a result, the apparatus can notify the user that channel expansion cannot be executed. Then, the user determines whether or not to continue the channel expansion processing, and can instruct the determination result to the communication apparatus.

Upon making communication using a channel that neighbors the operating channel, the communication apparatus probes the presence of networks in the neighboring channels of the operating channel and the next neighboring channels of the operating channel. Then, the communication apparatus makes communications using the operating channel and neighboring channel, based on the probe result. In this way, adverse effects as a result of channel expansion can be prevented.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-130436, filed May 16, 2007, which is hereby incorporated by reference herein in its entirety.

The invention claimed is:

1. A communication apparatus comprising:
a computer-readable memory constructed to store computer-executable instructions implementing process steps; and
at least one processor constructed to execute the computer-executable instructions stored in the memory,
wherein the process steps implemented by the instructions stored in the memory comprise:
probing a presence of at least one other network by transmitting a probe signal onto a plurality of channels including a predetermined channel being used by said communication apparatus;
determining whether or not the detected at least one other network uses at least one of the plurality of channels;
requesting another communication apparatus to execute a communication using the plurality of channels if it is determined that the at least one other network does not use any of the plurality of channels;
executing the communication using the plurality of channels based on a response to the request; and
determining, in a case that it is determined that the at least one other network uses at least one of the plurality of channels, whether or not a main operation channel which the at least one other network mainly uses is the same as the predetermined channel,
wherein the request is executed if it is determined that the main operation channel which the at least one other network mainly uses is the same as the predetermined channel, and the request is not executed if it is determined that the main operation channel which the at least one other network mainly uses is different from the predetermined channel.

2. The apparatus according to claim 1, wherein a presence of a network is probed in a channel which neighbors the predetermined channel used by said communication apparatus.

3. The apparatus according to claim 1, wherein a presence of a network is probed in a channel which neighbors a neighboring channel of the predetermined channel used by said communication apparatus.

4. The apparatus according to claim 1, wherein the communication using the plurality of channels is a communication which uses a main operation channel as a master channel, and an expansion channel as a slave channel, and
when a neighboring channel of the predetermined channel used by the communication apparatus is used as an expansion channel by the at least one other network, the presence of which is confirmed, and the predetermined channel used by the communication apparatus is the same as a main operation channel of the at least one other network, the communication is made using a main operation channel and an expansion channel in correspondence with the main operation channel and the expansion channel of the at least one other network.

5. The apparatus according to claim 1, wherein the communication using the plurality of channels is a communication which uses a main operation channel as a master channel, and an expansion channel as a slave channel, and
the process steps implemented by the instructions stored in the memory further comprise notifying, when a channel which neighbors the predetermined channel used by the communication apparatus is used as a main operation channel by the at least one other network, the presence of which is confirmed, a user that the communication using the plurality of channels cannot be made.

6. The apparatus according to claim 1, wherein the process steps implemented by the instructions stored in the memory further comprise notifying a user that the communication using the plurality of channels is not made, based on a response to the issued request.

7. The apparatus according to claim 1, wherein the communication using the plurality of channels is a communication which uses a main operation channel as a master channel, and an expansion channel as a slave channel, and
when a neighboring channel of a channel used by the communication apparatus is used neither as a main operation channel nor as an expansion channel, the neighboring channel is used as an expansion channel.

8. The apparatus according to claim 1, wherein the communication using the plurality of channels is a communication which uses a main operation channel as a master channel, and an expansion channel as a slave channel, and
other communication apparatuses are requested to make the communication using the plurality of channels by indicating channels selected as the main operation channel and the expansion channel.

9. A communication method for a communication apparatus, the method comprising:
a probe step of probing a presence of at least one other network by transmitting a probe signal onto a plurality of channels including a predetermined channel being used by said communication apparatus;
a first determination step of determining whether or not the at least one other network detected in the probe step uses at least one of the plurality of channels;
a request step of requesting another communication apparatus to execute a communication using the plurality of channels if it is determined that the at least one other network does not use any of the plurality of channels;
an expansion step of executing the communication using the plurality of channels based on a response to the request issued in the request step; and a second determination step of determining, in a case that it is determined in the first determination step that the at least one other network uses at least one of the plurality of channels, whether or not a main operation channel which the at least one other network mainly uses is the same as the predetermined channel, wherein, in the request step, the request is issued if it is determined that the main operation channel which the at least one other network mainly uses is the same as the predetermined channel, and the request is not issued if it is determined that the main operation channel which the at least one other network mainly uses is different from the predetermined channel.

* * * * *